United States Patent
Yamanishi

(10) Patent No.: US 11,447,628 B2
(45) Date of Patent: Sep. 20, 2022

(54) LIQUID-CRYSTALLINE RESIN COMPOSITION AND MOLDED ARTICLE

(71) Applicant: Sumitomo Chemical Company, Limited, Tokyo (JP)

(72) Inventor: Keisuke Yamanishi, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/334,183

(22) PCT Filed: Sep. 22, 2017

(86) PCT No.: PCT/JP2017/034368
§ 371 (c)(1),
(2) Date: Mar. 18, 2019

(87) PCT Pub. No.: WO2018/062050
PCT Pub. Date: Apr. 5, 2018

(65) Prior Publication Data
US 2019/0211204 A1    Jul. 11, 2019

(30) Foreign Application Priority Data

Sep. 28, 2016 (JP) .............................. JP2016-189559

(51) Int. Cl.
| | | |
|---|---|---|
| *C08L 53/02* | (2006.01) | |
| *C25D 5/56* | (2006.01) | |
| *C08L 67/03* | (2006.01) | |
| *C08K 7/14* | (2006.01) | |
| *C09K 19/38* | (2006.01) | |
| *C08L 101/12* | (2006.01) | |
| *B29C 45/00* | (2006.01) | |
| *C08L 1/02* | (2006.01) | |
| *B29K 67/00* | (2006.01) | |
| *B29K 201/00* | (2006.01) | |
| *C08L 5/08* | (2006.01) | |
| *B29K 105/00* | (2006.01) | |

(52) U.S. Cl.
CPC .............. *C08L 67/03* (2013.01); *C08K 7/14* (2013.01); *C08L 101/12* (2013.01); *C09K 19/3809* (2013.01); *B29C 45/0005* (2013.01); *B29K 2067/00* (2013.01); *B29K 2105/0079* (2013.01); *B29K 2201/00* (2013.01); *B29K 2205/00* (2013.01); *C08K 2201/014* (2013.01); *C08L 1/02* (2013.01); *C08L 5/08* (2013.01); *C08L 2205/16* (2013.01)

(58) Field of Classification Search
CPC . C08L 67/03; C08L 53/02; C08K 7/14; B29C 45/00; C25D 5/56
USPC .......................................................... 524/35
See application file for complete search history.

(56) References Cited

U.S. PATENT DOCUMENTS

| | | | |
|---|---|---|---|
| 4,874,800 A | 10/1989 | Minamisawa et al. | |
| 5,492,946 A * | 2/1996 | Huspeni .................. | C08L 67/00 524/12 |
| 6,432,323 B1 * | 8/2002 | Maeda ..................... | C08K 9/08 252/299.01 |
| 2002/0153111 A1 | 10/2002 | Kumada et al. | |
| 2013/0313468 A1 * | 11/2013 | Nakamura .............. | C08L 67/02 252/62.54 |
| 2014/0080940 A1 | 3/2014 | Lee et al. | |
| 2015/0198301 A1 | 7/2015 | Yasuda et al. | |
| 2016/0115273 A1 | 4/2016 | Xu | |

FOREIGN PATENT DOCUMENTS

| | | | |
|---|---|---|---|
| CN | 1376827 A | | 10/2002 |
| CN | 103351872 A | | 10/2013 |
| CN | 103911015 A | | 7/2014 |
| CN | 104487765 A | | 4/2015 |
| JP | 08-231832 A | | 9/1996 |
| JP | 2002-348487 A | | 12/2002 |
| JP | 2008-081588 A | | 4/2008 |
| JP | 2009249536 A | * | 10/2009 |
| JP | 2013181084 A | * | 9/2013 |
| JP | 2016-172823 A | | 9/2016 |
| WO | 2013133914 A2 | | 9/2013 |

OTHER PUBLICATIONS

Office Action dated Apr. 7, 2020 in JP Application No. 2016189559 (with English MachineTranslation).
Int'l Search Report dated Nov. 14, 2017 in Int'l Application No. PCT/JP2017/034368.
Mingbao, L., "Modeling and Simulation Research of Timber Mechanics Based on Finite Element Theory," published by Northeast Forestry University, pp. 31-32 (2008) (with English Translation).
Office Action dated Nov. 2, 2020 in CN Application No. 201780058696.5 (with English Machine Translation).
Office Action dated Jan. 5, 2021 in JP Application No. 2016189559 (with English Machine Translation).
Office Action dated Jan. 29, 2021 in TW Application No. 106133046.
Jinping et al., "Plastics Industry Handbook Injection Molding and Molding Process and Equipment," First Publishing, Chemical Industry Press, p. 172 (2001).
Office Action dated Jun. 22, 2021 in CN Application No. 201780058696.5 (with English Machine Translation).
Office Action dated Jul. 7, 2021 in KR Application No. 1020197008421 (with English Machine Translation).

* cited by examiner

*Primary Examiner* — Deve V Hall
(74) *Attorney, Agent, or Firm* — Panitch Schwarze Belisario & Nadel LLP

(57) ABSTRACT

A liquid-crystalline resin composition is provided, containing: a liquid-crystalline resin; and a fibrous filler formed of crystalline polysaccharides, in which a 5% weight loss temperature of the fibrous filler is 280° C. or higher.

9 Claims, No Drawings

LIQUID-CRYSTALLINE RESIN COMPOSITION AND MOLDED ARTICLE

CROSS-REFERENCE TO RELATED APPLICATION

This application is a Section 371 of International Application No PCT/JP2017/034368, filed Sep. 22, 2017, which was published in the Japanese language on Apr. 5, 2018 under International Publication No. WO 2018/062050 A1, which claims priority under 35 U.S.C. § 119(b) to Japanese Application No. 2016-189559, filed Sep. 28, 2016, the disclosures of which are incorporated herein by reference in their entirety.

TECHNICAL FIELD

The present inveniton relates to a liquid-crystalline resin composition and a molded article.

BACKGROUND ART

A liquid-crystalline resin such as liquid crystal polyester has excellent melt fluidity and high heat resistance, strength, and rigidity, and thus the liquid-crystalline resin has been suitably used as an injection molding material for electric and electronic components. However, the liquid-crystalline resin has a problem in that anisotropy of the shrinkage rate, the expansion rate, or the mechanical properties may easily occur in a molded article because the molecular chain thereof tends to be oriented in a flow direction during molding. In order to solve such a problem, a technique of suppressing the above-described anisotropy by blending an inorganic filler such as glass fibers into the liquid-crystalline resin is known to be employed (for example, PTL 1).

CITATION LIST

Patent Literature

[PTL 1] Japanese Unexamined Patent Application, First Publication No. H08-231832

SUMMARY OF INVENTION

Technical Problem

However, in the molded article formed by molding a liquid-crystalline resin composition of the related art which contains a liquid-crystalline resin and an inorganic filler such as glass fibers, as described in PTL 1, the inorganic filler easily protrudes from a surface of the molded article and the surface of the molded article becomes rough in some cases. In other words, it is difficult to mold a molded article having a small surface roughness while suppressing the anisotropy of the mold shrinkage rate, using a liquid-crystalline resin composition of the related art.

The present invention has been made in consideration of the above-described circumstances, and an object thereof is to provide a liquid-crystalline resin composition that enables molding of a molded article having a small surface roughness while suppressing the anisotropy of the mold shrinkage rate and the molded article thereof.

Solution to Problem

As the result of intensive research repeatedly conducted by the present inventors in order to solve the above-described problems, it was found that a molded article having a small surface roughness while suppressing the anisotropy of the mold shrinkage rate can be molded in a case where a liquid-crystalline resin composition containing a liquid-crystalline resin and a fibrous filler formed of crystalline polysaccharides, in which a 5% weight loss temperature of the fibrous filler is 280° C. or higher, is used.

According to an aspect of the present invention, a liquid-crystalline resin composition is provided, containing a liquid-crystalline resin; and a fibrous filler formed of crystalline polysaccharides, in which a 5% weight loss temperature of the fibrous filler is 280° C. or higher.

According to the aspect of the present invention, it is preferable that the crystalline polysaccharides be one or more selected from the group consisting of cellulose, chitin, and derivatives thereof.

According to the aspect of the present invention, it is preferable that a content of the fibrous filler be in a range of 5 parts by mass to 50 parts by mass with respect to 100 parts by mass of the liquid-crystalline resin.

According to another aspect of the present invention, a molded article is provided which is formed by molding the liquid-crystalline resin composition described above.

In other words, the present invention has the following aspects.

[1] A liquid-crystalline resin composition, containing: a liquid-crystalline resin; and a fibrous filler formed of crystalline polysaccharides, in which a 5% weight loss temperature of the fibrous filler is 280° C. or higher.

[2] The liquid-crystalline resin composition according to [1], in which the crystalline polysaccharides are one or more selected from the group consisting of cellulose, chitin, and derivatives thereof.

[3] The liquid-crystalline resin composition according to [1] or [2], in which a content of the fibrous filler is in a range of 5 parts by mass to 50 parts by mass with respect to 100 parts by mass of the liquid-crystalline resin.

[4] A molded article which is formed by molding the liquid-crystalline resin composition according to any one of [1] to [3].

Advantageous Effects of Invention

According to the aspects of the present invention, it is possible to provide a liquid-crystalline resin composition that enables molding of a molded article having a small surface roughness while suppressing the anisotropy of the mold shrinkage rate and the molded article thereof.

DESCRIPTION OF EMBODIMENTS

<Liquid-Crystalline Resin Composition>

A liquid-crystalline resin composition of the present embodiment contains a liquid-crystalline resin and a fibrous filler formed of crystalline polysaccharides (hereinafter, also simply referred to as a "fibrous filler"). According to the liquid-crystalline resin composition of the present embodiment, it is possible to mold a molded article having a small surface roughness while suppressing the anisotropy of the mold shrinkage rate.

In the present specification, the "mold shrinkage rate" indicates a value obtained by dividing a difference between a measured value (unit: mm) of a molded article and a dimension (unit: mm) of a cavity of a die used for molding, by the dimension of the cavity. Further, the dimension of the cavity is a dimension at room temperature (20° C.). The die used for measuring the mold shrinkage rate of the present embodiment is a die for a plate test piece which is provided with a film gate on one side and has a cavity having a length of 64 mm, a width of 64 mm, and a thickness of 3 mm. The dimension of the molded article can be measured using a micrometer.

In the present specification, the "anisotropy of the mold shrinkage rate" is evaluated based on the anisotropy ratio (hereinafter, also referred to as "MD/TD") obtained by performing the above-described measurement of the mold shrinkage rate in a flow direction of a liquid-crystalline resin and a direction perpendicular to the flow direction and dividing the mold shrinkage rate in the flow direction (hereinafter, also referred to as "MD") by the mold shrinkage rate in the direction perpendicular to the flow direction (hereinafter, also referred to as "TD"). Further, the average value of the mold shrinkage rates for two sides of the molded article along the flow direction of the liquid-crystalline resin is set as MD and the average value of the mold shrinkage rates for two sides of the molded article along the direction perpendicular to the flow direction is set as TD. In the present specification, in a case where MD/TD is closer to 1, this indicates that the anisotropy of the mold shrinkage rate in the molded article decreases. In other words, in the present specification, it can be said that the anisotropy of the mold shrinkage rate in a molded article to be obtained is suppressed as MD/TD is closer to 1.

In the present specification, the "surface roughness" indicates a three-dimensional surface roughness (Sa) defined in ISO 25178. Hereinafter, the "three-dimensional surface roughness (Sa)" is simply referred to as a "surface roughness (S a)". The surface roughness (Sa) is acquired by dividing the volume of a portion surrounded by undulations and curves (hereinafter, referred to as the "surface undulating form") of a surface of a target to be measured and an average surface determined according to the following method, by the measurement area of the target to be measured. In other words, in a case where the xyz orthogonal coordinate system is set, the average surface is set as an X-Y plane, the height direction is set as a Z axis, and an area z in the surface undulating form measured according to the following method is expressed as "z=f(x, y)", the surface roughness (Sa) is defined by the following equation.

$$S_a = \frac{1}{L_x L_y} \int_0^{L_x} \int_0^{L_y} f(x, y) dx dy$$

Here, in the above-described equation, $L_x$ represents a measured length of the average surface in an X direction, and $L_y$ represents a measured length of the average surface in a Y direction. The surface roughness (Sa) is measured by performing non-contact surface shape measurement using lasers or electron beams. As a device used for the non-contact surface shape measurement, a 3D microscope ("VR-3200", manufactured by KEYENCE CORPORATION) is exemplified.

[Liquid-Crystalline Resin]

A liquid-crystalline resin used in the present embodiment is a thermotropic liquid crystal polymer and may form a melt exhibiting optical anisotropy in a temperature range of 250° C. to 450° C. Hereinafter, a description will be made by exemplifying liquid crystal polyester as a thermotropic liquid crystal polymer, but the present embodiment is not limited thereto.

Specific examples of the liquid crystal polyester include the following (1) to (4).

(1): Those obtained by polymerizing a combination of an aromatic hydroxycarboxylic acid, an aromatic dicarboxylic acid, and an aromatic diol (2): Those obtained by polymerizing a plurality of aromatic hydroxycarboxylic acids (3): Those obtained by polymerizing a combination of an aromatic dicarboxylic acid and an aromatic diol (4): Those obtained by reacting crystalline polyester such as polyethylene terephthalate with an aromatic hydroxycarboxylic acid Further, in the production of liquid crystal polyester, some or all of the aromatic hydroxycarboxylic acid, the aromatic dicarboxylic acid, and the aromatic diol used as raw material monomers can be formed into ester-forming derivatives in advance to be provided for polymerization. By using such ester-forming derivatives, there is an advantage that the liquid crystal polyester can be more easily produced.

Examples of the ester-forming derivative include the following compounds.

Examples of the ester-forming derivative of an aromatic hydroxycarboxylic acid and an aromatic dicarboxylic acid which have a carboxyl group in a molecule include a compound in which the carboxyl group is converted to a highly reactive group such as a haloformyl group (an acid halide) or an acyloxycarbonyl group (an acid anhydride); and a compound in which the carboxyl group forms an ester together with monohydric alcohols, polyhydric alcohols such as ethylene glycol, or phenols such that polyester is generated by a transesterification reaction.

Examples of a polymerizable derivative of a compound containing a phenolic hydroxyl group such as an aromatic hydroxycarboxylic acid and an aromatic diol include a compound in which the phenolic hydroxyl group forms an ester together with lower aliphatic carboxylic acids having 2 to 4 carbon atoms such that polyester is generated by a transesterification reaction.

Further, within the range not inhibiting the ester-forming properties, the aromatic hydroxycarboxylic acid, the aromatic dicarboxylic acid, or the aromatic diol may contain, as substituents, a halogen atom such as a chlorine atom or a fluorine atom; an alkyl group having 1 to 10 carbon atoms such as a methyl group, an ethyl group, or a butyl group; and an aryl group having 6 to 20 carbon atoms such as a phenyl group in the aromatic ring thereof.

Examples of the aromatic hydroxycarboxylic acid include p-hydroxybenzoic acid (an aromatic hydroxycarboxylic acid from which the following ($A_1$) is derived), m-hydroxybenzoic acid, 6-hydroxy-2-naphthoic acid (an aromatic hydroxycarboxylic acid from which the following ($A_2$) is derived), 3-hydroxy-2-naphthoic acid, 5-hydroxy-1-naphthoic acid, 4-hydroxy-4'-carboxydiphenyl ether, and an aromatic hydroxycarboxylic acid in which some hydrogen atoms in an aromatic ring of an aromatic hydroxycarboxylic acid are substituted with one or more substituents selected from the group consisting of an alkyl group, an aryl group, and a halogen atom. The aromatic hydroxycarboxylic acid may be used alone or in combination of two or more kinds thereof in the production of liquid crystal polyester.

Examples of repeating units derived from such aromatic hydroxycarboxylic acids include the following. Further, a repeating unit derived from an aromatic hydroxycarboxylic acid may be formed such that some hydrogen atoms in the aromatic ring thereof are substituted with one or more substituents selected from the group consisting of a halogen atom, an alkyl group, and an aryl group.

In the present specification, "derived" indicates that the chemical structure is changed due to polymerization of raw material monomers and other structures are not changed.

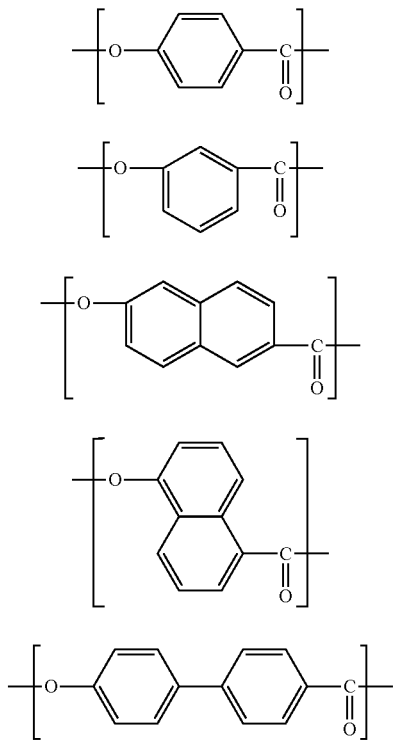

Examples of the aromatic dicarboxylic acid include terephthalic acid (an aromatic dicarboxylic acid from which the following ($B_1$) is derived), isophthalic acid (an aromatic dicarboxylic acid from which the following ($B_2$) is derived), biphenyl-4,4'-dicarboxylic acid, 2,6-naphthalenedicarboxylic acid (an aromatic dicarboxylic acid from which the following ($B_3$) is derived), diphenyl ether-4,4'-dicarboxylic acid, diphenyl thioether-4,4'-dicarboxylic acid, and an aromatic dicarboxylic acid in which some hydrogen atoms in an aromatic ring of an aromatic dicarboxylic acid are substituted with one or more substituents selected from the group consisting of an alkyl group, an aryl group, and a halogen atom. The aromatic dicarboxylic acid may be used alone or in combination of two or more kinds thereof in the production of liquid crystal polyester.

Examples of repeating units derived from such aromatic dicarboxylic acids include the following. Further, a repeating unit derived from an aromatic dicarboxylic acid may be formed such that some hydrogen atoms in the aromatic ring thereof are substituted with one or more substituents selected from the group consisting of a halogen atom, an alkyl group, and an aryl group.

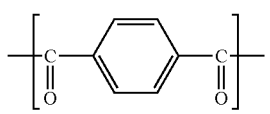

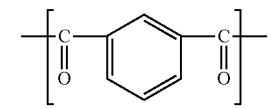

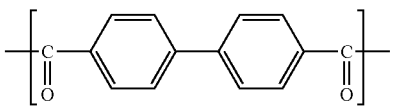

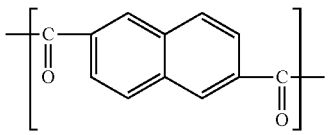

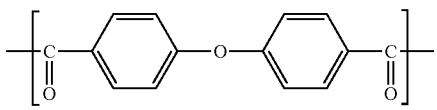

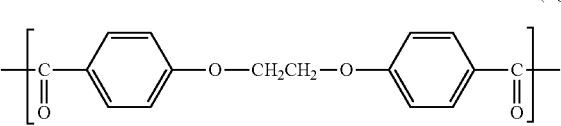

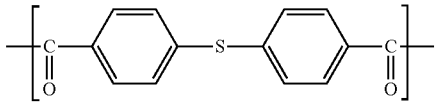

Examples of the aromatic diol include 4,4'-dihydroxybiphenyl (an aromatic diol from which the following ($C_1$) is derived), hydroquinone (an aromatic diol from which the following ($C_2$) is derived), resorcin (an aromatic diol from which the following ($C_3$) is derived), 4,4'-dihydroxydiphenyl ketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, and an aromatic diol in which some hydrogen atoms in an aromatic ring of an aromatic diol are substituted with one or more substituents selected from the group consisting of an alkyl group, an aryl group, and a halogen atom. The aromatic diol may be used alone or in combination of two or more kinds thereof in the production of liquid crystal polyester.

Examples of such a repeating unit derived from an aromatic diol include the following. Further, the repeating unit derived from an aromatic diol may be formed such that some hydrogen atoms in the aromatic ring thereof are substituted with one or more substituents selected from the group consisting of a halogen atom, an alkyl group, and an aryl group.

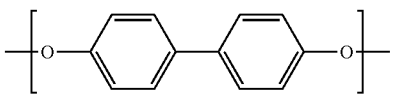

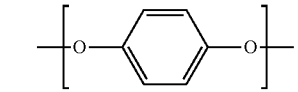

-continued

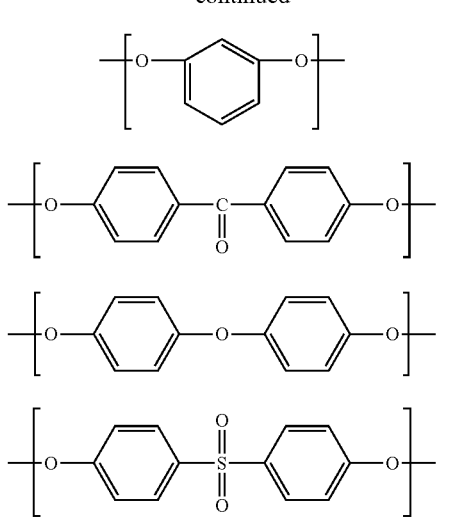

Examples of the halogen atom serving as a substituent which may be optionally included in the repeating unit (in other words, the repeating unit derived from an aromatic hydroxycarboxylic acid, the repeating unit derived from an aromatic dicarboxylic acid, or the repeating unit derived from an aromatic diol) include a fluorine atom, a chlorine atom, and a bromine atom. Further, examples of the alkyl group which is the substituent include a lower alkyl group having about 1 to 4 carbon atoms such as a methyl group, an ethyl group, or a butyl group. Further, examples of the aryl group which is the substituent include a phenyl group.

Hereinafter, a suitable liquid crystal polyester will be described.

It is preferable that the liquid crystal polyester have any one or both of a repeating unit ($A_1$) derived from parahydroxybenzoic acid and a repeating unit ($A_2$) derived from 2-hydroxy-6-naphthoic acid as the repeating unit derived from an aromatic hydroxycarboxylic acid; preferable that the liquid crystal polyester have one or more repeating units selected from the group consisting of a repeating unit ($B_1$) derived from terephthalic acid, a repeating unit ($B_2$) derived from isophthalic acid, and a repeating unit ($B_3$) derived from 2,6-naphthalenedicarboxylic acid as the repeating unit derived from an aromatic dicarboxylic acid; and preferable that the liquid crystal polyester have any one or both of a repeating unit ($C_2$) derived from hydroquinone and a repeating unit ($C_1$) derived from 4,4'-dihydroxybiphenyl as the repeating unit derived from an aromatic diol.

More preferred examples of the liquid crystal polyester include:

liquid crystal polyester in which the total number of moles of the repeating unit derived from an aromatic hydroxycarboxylic acid such as any one or both of the repeating unit ($A_1$) derived from parahydroxybenzoic acid and the repeating unit ($A_2$) derived from 2-hydroxy-6-naphthoic acid is in a range of 30% by mole to 80% by mole with respect to the total number of moles of all repeating units;

liquid crystal polyester in which the total number of moles of the repeating unit derived from an aromatic diol such as any one or both of the repeating unit ($C_2$) derived from hydroquinone and the repeating unit ($C_1$) derived from 4,4'-dihydroxybiphenyl is in a range of 10% by mole to 35% by mole with respect to the total number of moles of all repeating units; and liquid crystal polyester in which the total number of moles of the repeating unit derived from an aromatic dicarboxylic acid selected from the group consisting of the repeating unit ($B_1$) derived from terephthalic acid, the repeating unit ($B_2$) derived from isophthalic acid, and the repeating unit ($B_3$) derived from 2,6-naphthalenedicarboxylic acid is in a range of 10% by mole to 35% by mole with respect to the total number of moles of all repeating units.

Preferred examples of the liquid crystal polyester include liquid crystal polyester in which the number of moles of the repeating unit ($B_2$) derived from isophthalic acid is in a range of 5% by mole to 30% by mole with respect to total number of moles of all repeating units of liquid crystal polyester. In a case where the content of the repeating unit ($B_2$) derived from isophthalic acid in the liquid crystal polyester is in a range of 5% by mole to 30% by mole, the molding temperature of liquid crystal polyester can be controlled to be low. In this manner, a molded article can be molded at a molding temperature suitable for liquid crystal polyester to be used even in a case where a filler having lower heat resistance, such as a fibrous filler formed of crystalline polysaccharides described below, than that of an inorganic filler used in the related art is used.

In the present specification, the content of each repeating unit in liquid crystal polyester is determined based on the amount (unit: mole) of raw material monomers to be charged, which correspond to each repeating unit with respect to the total amount (unit: mole) of the raw material monomers to be used.

As a method of producing the liquid crystal polyester, for example, a known method, for example, a method described in Japanese Unexamined Patent Application, First Publication No. 2002-146003 can be employed. In other words, a method of performing solid phase polymerization by melting and polymerizing (polycondensing) the above-described raw material monomers (such as an aromatic hydroxycarboxylic acid, an aromatic dicarboxylic acid, an aromatic diol, and these derivatives for forming an ester) to obtain an aromatic polyester having a relatively low molecular weight (hereinafter, abbreviated as a "prepolymer") compared to the target liquid crystal polyester, forming this prepolymer into powder, and heating the powder is exemplified. By performing solid phase polymerization in the above-described manner, the polymerization is promoted so that liquid crystal polyester having a higher molecular weight than that of the prepolymer can be obtained.

In addition, other methods of producing liquid crystal polyester having a combination of the repeating unit ($A_1$), any one or both of the repeating units ($B_1$) and ($B_2$), and the repeating unit ($C_1$) and a combination of the repeating units ($A_1$) and ($A_2$), serving as the most basic structures, are described in Japanese Examined Patent Application, Second Publication No. S47-047870 and Japanese Examined Patent Application, Second Publication No. S63-003888. In other words, the liquid crystal polyester having a combination of the repeating unit ($A_1$), the repeating unit ($B_1$), and the repeating unit ($C_1$) is obtained by carrying out a reaction of p-hydroxybenzoic acid in the presence of diphenyl terephthalate and phenyl acetate and reacting this reaction product with p,p'-biphenol. Further, liquid crystal polyester having a combination of the repeating unit ($A_1$) and the repeating unit ($A_2$) is obtained by polymerizing p-acetoxybenzoic acid and 6-acetoxy-2-naphthoic acid.

The melt polymerization may be performed in the presence of a catalyst, and examples of the catalyst in this case include a metal compound such as magnesium acetate, stannous acetate, tetrabutyl titanate, lead acetate, sodium acetate, potassium acetate, or antimony trioxide; and a nitrogen-containing heterocyclic compound such as 4-(dimethylamino)pyridine or 1-methylimidazole. Among these, a nitrogen-containing heterocyclic compound is preferably used.

The flow starting temperature of the liquid crystal polyester contained in the liquid-crystalline composition of the present embodiment is preferably 280° C. or higher. As described above, in a case where solid phase polymerization is used in the production of liquid crystal polyester, liquid crystal polyester having a flow starting temperature of 280° C. or higher can be produced in a relatively short time among liquid crystal polyesters. Further, in a case where the liquid crystal polyester at such a flow starting temperature is used as a thermoplastic resin of the present embodiment, a molded article to be obtained has high heat resistance. In addition, from the viewpoint of molding a molded article in a practical temperature range, the flow starting temperature of the liquid crystal polyester contained in the liquid-crystalline composition is preferably 350° C. or lower and more preferably 330° C. or lower. Further, the flow starting temperature of the liquid-crystalline polyester may be 320° C. or lower, 310° C. or lower, 300° C. or lower, or 290° C. or lower. Further, from the viewpoint of moldability, it is preferable that the flow starting temperature of the liquid crystal polyester be lower than the 5% weight loss temperature of the fibrous filler formed of crystalline polysaccharides according to the present embodiment.

As one aspect, the flow starting temperature of the liquid crystal polyester of the present embodiment is preferably in a range of 280° C. to 350° C. and more preferably in a range of 280° C. to 330° C., and may be in a range of 280° C. to 320° C., in a range of 280° C. to 310° C., in a range of 280° C. to 300° C., or in a range of 280° C. to 290° C.

Here, the flow starting temperature is a temperature showing that the melt viscosity is 4800 Pa·s (48000 poise) at the time of extruding the liquid crystal polyester from a nozzle at a temperature rising rate of 4° C./min under a load of 9.8 MPa (100 kg/cm2) using a capillary type rheometer equipped with a die having an inner diameter of 1 mm and a length of 10 mm. The flow starting temperature is an index indicating the molecular weight of liquid crystal polyester which is well-known in the technical field (see "Synthesis, Molding and Application of Liquid Crystalline Polymers", edited by KOIDE Naoyuki, p. 95 to 105, published by CMC Publishing CO., LTD., on Jun. 5, 1987). As a device for measuring the flow starting temperature, for example, a flow characteristic evaluation device "FLOW TESTER CFT-500D" (manufactured by Shimadzu Corporation) can be used.

In the present embodiment, the content of the liquid-crystalline resin is preferably in a range of 50% by mass to 95% by mass with respect to the total mass of the liquid-crystalline resin composition of the present embodiment.

[Fibrous Filler Formed of Crystalline Polysaccharides]

The liquid-crystalline resin composition of the present embodiment contains a fibrous filler formed of crystalline polysaccharides. In the present specification, polysaccharides having a crystal portion and an amorphous portion are referred to as "crystalline polysaccharides". The fibrous filler of the present embodiment is obtained by purifying and crushing natural materials (such as woods containing a large amount of cellulose and crab shells containing a large amount of chitin) containing crystalline polysaccharides. The content of the crystalline polysaccharides in the fibrous filler is in a range of 80% by mass to 100% by mass, preferably in a range of 90% by mass to 100% by mass, more preferably in a range of 95% by mass to 100% by mass, and still more preferably in a range of 98% by mass to 100% by mass with respect to the total mass of the fibrous filler.

In the related art, the fibrous filler formed of crystalline polysaccharides has been applied to a composition containing a resin whose molding temperature is relatively low, among general purpose resins such as polypropylene, but has not been used for a composition containing a resin whose molding temperature is relatively high, among general purpose resins such as liquid crystal polyester, due to the problem of heat resistance. However, as the result of examination conducted by the present inventors, it was found that the fibrous filler formed of crystalline polysaccharides can be applied to a molded article obtained by molding a liquid-crystalline resin by setting the 5% weight loss temperature of the fibrous filler to 280° C. or higher.

In other words, in the present specification, the 5% weight loss temperature of the fibrous filler is in a range of 280° C. to 400° C. By setting the 5% weight loss temperature of the fibrous filler to be in a range of 280° C. to 400° C., the liquid-crystalline resin composition can be molded according to, for example, a melt molding method to obtain a molded article.

In the present specification, the 5% weight loss temperature of the fibrous filler indicates a temperature set by heating and burning 10 mg of a sample of the fibrous filler to 600° C. at a temperature rising rate of 20° C./min and reducing the weight of the sample by 5% by mass with respect to the total mass of the sample at 150° C. based on the TGA curve obtained at this time.

In a case where the 5% weight loss temperature is higher, this means that the heat resistance of the fibrous filler to be used is higher.

The 5% weight loss temperature of the fibrous filler is preferably 300° C. or higher, more preferably 310° C. or higher, still more preferably 320° C. or higher, and particularly preferably 330° C. or higher. Further, the 5% weight loss temperature of the fibrous filler is preferably 400° C. or lower and more preferably 380° C. or lower.

As one aspect, the 5% weight loss temperature of the fibrous filler contained in the liquid-crystalline resin composition according to the present embodiment is preferably in a range of 300° C. to 400° C., more preferably in a range of 310° C. to 390° C., still more preferably in a range of 320° C. to 380° C., and particularly preferably in a range of 330° C. to 370° C.

The crystalline polysaccharides are not particularly limited as long as a compound that enables the 5% weight loss temperature of the fibrous filler to be set in a range of 280° C. to 400° C. is used. Among examples of such crystalline polysaccharides, one or more selected from the group consisting of cellulose, chitin, and derivatives of these are preferable. Examples of the derivatives of cellulose include methyl cellulose.

It is known that the fibrous filler formed of crystalline polysaccharides is softer than a typical inorganic filler used for a molded article of the related art. Therefore, it is speculated that the fibrous filler formed of crystalline polysaccharides is unlikely to protrude from a surface of a molded article and the surface of the molded article is unlikely to be roughened. Accordingly, in a case where the liquid-crystalline resin composition contains the fibrous filler formed of crystalline polysaccharides, the surface roughness (Sa) of the molded article can be decreased.

The number-average fiber length of the fibrous filler formed of crystalline polysaccharides is preferably in a range of 10 μm to 300 μm, more preferably in a range of 30 μm to 250 μm, and still more preferably in a range of 50 μm to 200 μm. In a case where the number-average fiber length of the fibrous filler is 10 μm or greater, the strength of the molded article can be sufficiently increased. Further, in a case where the number-average fiber length of the fibrous filler is 300 μm or less, a liquid-crystalline resin composition is easily molded. In the present specification, a value obtained by measurement using a microscope can be employed as the number-average fiber length of the fibrous filler.

In the present embodiment, the content of the fibrous filler formed of crystalline polysaccharides is preferably in a range of 5 parts by mass to 50 parts by mass with respect to 100 parts by mass of the liquid-crystalline resin. In a case where the content of the fibrous filler is in the above-described range, the anisotropy of the mold shrinkage rate can also be further suppressed, compared to a typical inorganic filler used for a molded article of the related art. The content of the fibrous filler is preferably in a range of 5 parts by mass to 25 parts by mass and more preferably in a range of 7 parts by mass to 25 parts by mass with respect to 100 parts by mass of the liquid-crystalline resin.

The fibrous filler of the present embodiment may be used alone or in combination of two or more kinds thereof.

[Other Fillers]

The liquid-crystalline resin composition of the present embodiment may further contain fillers other than the fibrous filler formed of crystalline polysaccharides, within the range not impairing the effects of the present invention. According to the present embodiment, in a case where the liquid-crystalline resin composition contains other fillers in addition to the above-described filler, a molded article exhibiting sufficient strength can be obtained.

Other fillers may be inorganic fillers or organic fillers. Further, other fillers may be fibrous fillers other than the fibrous filler formed of crystalline polysaccharides, plate-like fillers, or granular fillers.

Examples of fibrous fillers other than the fibrous filler formed of crystalline polysaccharides include glass fibers; carbon fibers such as PAN-based carbon fibers and pitch-based carbon fibers; ceramic fibers such as silica fibers, alumina fibers, and silica alumina fibers; and metal fibers such as stainless steel fibers. Further, other examples thereof include whiskers such as potassium titanium whiskers, barium titanate whiskers, wollastonite whiskers, aluminum borate whiskers, silicon nitride whiskers, and silicon carbide whiskers. Among these, glass fibers are preferable.

Examples of the plate-like filler include talc, mica, graphite, wollastonite, barium sulfate, and calcium carbonate. The mica may be white mica, gold mica, fluorine phlogopite, or tetrasilicic mica.

Examples of the granular filler include silica, alumina, titanium oxide, boron nitride, silicon carbide, and calcium carbonate.

According to the present embodiment, in a case where the liquid-crystalline resin composition contains other fillers, the content of other fillers is preferably in a range of 5 parts by mass to 70 parts by mass and more preferably in a range of 10 parts by mass to 50 parts by mass with respect to 100 parts by mass of the liquid-crystalline resin.

According to the present embodiment, the content of other fillers is preferably in a range of 0 parts by mass to 2100 parts by mass, more preferably in a range of 0 parts by mass to 800 parts by mass, still more preferably in a range of 0 parts by mass to 520 parts by mass, and particularly preferably in a range of 0 parts by mass to 210 parts by mass and may be in a range of 0 parts by mass to 100 parts by mass with respect to 100 parts by mass of the fibrous filler formed of crystalline polysaccharides.

[Other Components]

The liquid-crystalline resin composition of the present embodiment may contain other components that do not correspond to both of the liquid-crystalline resin and the fillers (in other words, the fibrous filler formed of crystalline polysaccharides and fillers other than the fibrous filler) described above, within the range not impairing the effects of the present invention.

Examples of other components include additives typically used for injection-molded articles, for example, release-improving agents such as a fluorine resin and metal soaps; colorants such as dyes and pigments; antioxidants; thermal stabilizers; ultraviolet absorbing agents; antistatic agents; and surfactants.

Further, examples of other components also include those having external lubricant effects such as higher fatty acid, higher fatty acid ester, higher fatty acid metal salts, and fluorocarbon-based surfactants.

Further, examples of other components also include thermosetting resins such as a phenol resin, an epoxy resin, and a polyimide resin.

[Method of Producing Liquid-Crystalline Resin Composition]

A method of producing the liquid-crystalline resin composition of the present embodiment will be described below. Hereinafter, a case where liquid crystal polyester is used as a liquid-crystalline resin will be described.

[Method of Producing Liquid Crystal Polyester]

It is preferable that the liquid crystal polyester of the present invention be produced by an acylation step and a polymerization step described below.

[Acylation step]: An acylated substance (that is, an aromatic diol acylated substance and an aromatic hydroxycarboxylic acid acylated substance) is obtained by acylating phenolic hydroxyl groups of an aromatic diol and an aromatic hydroxycarboxylic acid using a fatty acid anhydride (such as acetic anhydride).

[Polymerization step]: Liquid crystal polyester is obtained by transesterifying and polymerizing an acyl group of the acylated substance obtained in the acylation step and a carboxyl group of the acylated substance of the aromatic dicarboxylic acid and the aromatic hydroxycarboxylic acid.

The acylation step and the polymerization step may be performed in the presence of a heterocyclic organic base compound shown below.

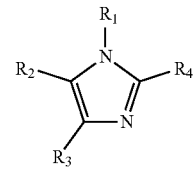

In the structural formula, $R_1$ to $R_4$ each independently represents a hydrogen atom, an alkyl group having 1 to 4 carbon atoms, a hydroxymethyl group, a cyano group, a cyanoalkyl group having an alkyl group with 1 to 4 carbon atoms, a cyanoalkoxy group having an alkoxy group with 1 to 4 carbon atoms, a carboxyl group, an amino group, an aminoalkyl group having 1 to 4 carbon atoms, an aminoalkoxy group having 1 to 4 carbon atoms, a phenyl group, a benzyl group, a phenylpropyl group, or a formyl group.

Among examples of the heterocyclic organic base compound in the formula shown above, from the viewpoint of availability, 1-methylimidazole or 1-ethylimidazole or both of these are particularly preferable.

Further, the amount of the heterocyclic organic base compound to be used is preferably in a range of 0.005 to 1 part by mass in a case where the total amount of the raw material monomers of liquid crystal polyester (in other words, an aromatic dicarboxylic acid, an aromatic diol, and an aromatic hydroxycarboxylic acid) is set to 100 parts by mass. Further, from the viewpoint of improving the color tone or the productivity of a molded article (a resin molded article in this embodiment), the amount of the heterocyclic organic base compound to be used is more preferably in a range of 0.05 to 0.5 parts by mass with respect to 100 parts by mass which is the total amount of the raw material monomers.

Such a heterocyclic organic base compound may be present at a time during the acylation reaction and the transesterification reaction, and the timing for adding the heterocyclic organic base compound may be immediately before the start of the acylation reaction, in the middle of the acylation reaction, or between the acylation and the transesterification reaction. The liquid crystal polyester obtained in the above-described manner has an advantage that the meld fluidity is extremely high.

The amount of the fatty acid anhydride (such as acetic anhydride) to be used is determined by considering the amount of the aromatic diol or the aromatic hydroxycarboxylic acid or both of these which are raw material monomers to be used. Specifically, the amount of the fatty acid anhydride is preferably in a range of 1.0 to 1.2 time equivalent, more preferably in a range of 1.0 to 1.15 time equivalent, still more preferably in a range of 1.03 to 1.12 time equivalent, and particularly preferably in a range of 1.05 to 1.1 time equivalent with respect to the total amount of the phenolic hydroxyl group contained in these raw material monomers.

It is preferable that the acylation reaction in the acylation step described above be performed in a temperature range of 130° C. to 180° C. for 30 minutes to 20 hours and more preferable that the acylation reaction be performed in a temperature range of 140° C. to 160° C. for 1 to 5 hours.

The aromatic dicarboxylic acid used in the polymerization step described above may be allowed to be present in the reaction system during the acylation step. In other words, the aromatic diol, the aromatic hydroxycarboxylic acid, and the aromatic dicarboxylic acid may be allowed to be present in the same reaction system during the acylation step.

The reason for this is that both of a carboxyl group in the aromatic dicarboxylic acid and a substituent which may be optionally substituted are not affected by the fatty acid anhydride at all. Therefore, a method of sequentially performing the acylation step and the polymerization step after an aromatic diol, an aromatic hydroxycarboxylic acid, and an aromatic dicarboxylic acid are added to a reactor or a method of performing the polymerization step after an aromatic diol and an aromatic dicarboxylic acid are added to a reactor, the acylation step is performed, and then an aromatic dicarboxylic acid is further added to the reactor may be employed. From the viewpoint of simplifying the production step, the former method is preferable.

It is preferable that the transesterification reaction in the polymerization step be performed by increasing the temperature from 130° C. to 400° C. at a temperature rising rate of 0.1° C./min to 50° C./min and more preferable that the transesterification reaction be performed by increasing the temperature from 150° C. to 350° C. at a temperature rising rate of 0.3° C./min to 5° C./min.

Further, during the transesterification reaction of the polymerization step, it is preferable that fatty acid (such as acetic acid) to be generated as a by-product and an unreacted fatty acid anhydride (such as acetic anhydride) be evaporated to be distilled out of the system in order to shift the equilibrium. At this time, by refluxing a part of the fatty acid to be distilled off and returning the part of the fatty acid to the reactor, raw material monomers and the like which are evaporated or sublimed together with the fatty acid can be condensed or reverse-sublimed so as to be returned to the reactor.

In the acylation reaction during the acylation step and the transesterification reaction during the polymerization step, a batch device or a continuous device may be used as the reactor. Even in a case where any of these devices is used, liquid crystal polyester which can be used in the present embodiment is obtained.

After the polymerization step described above, a step for increasing the molecular weight of the liquid crystal polyester obtained in the polymerization step may be performed. For example, the molecular weight of the liquid crystal polyester can be increased by cooling and crushing the liquid crystal polyester obtained in the polymerization step to prepare powdery liquid crystal polyester and heating this powder.

The molecular weight of the liquid crystal polyester may be increased by granulating the powdery liquid crystal polyester obtained by cooling and crushing the liquid crystal polyester described above to prepare pellet-like liquid crystal polyester and heating the pellet-like liquid crystal polyester. The method of increasing the molecular weight using these methods is referred to as solid phase polymerization in the technical field. The solid phase polymerization is particularly effective as the method of increasing the molecular weight of the liquid crystal polyester. By increasing the molecular weight of the liquid crystal polyester, liquid crystal polyester having a suitable flow starting temperature described above can be obtained.

It is preferable that the heat treatment during the solid phase polymerization be performed in an inert gas (such as nitrogen) atmosphere or under reduced pressure. Further, it is preferable that the heating time during the solid phase polymerization be set to be in a range of 1 to 20 hours. The heating temperature is preferably in a range of 130° C. to 400° C.

Further, examples of devices used during this heat treatment include a dryer, a reactor, an inert oven, a mixer, and an electric furnace which are known.

[Method of Blending Liquid-Crystalline Resin Composition]

A method of blending the raw material components of the liquid-crystalline resin composition according to the present embodiment is not particularly limited. For example, the liquid crystal polyester produced using the above-described method, the fibrous filler formed of crystalline polysaccharides, the fillers (in other words, fibrous fillers, plate-like fillers, granular fillers, and the like) other than the fibrous filler formed of crystalline polysaccharides as necessary, and other components (in other words, a release-improving agent, a colorant, and the like) described above may be each and separately supplied to a melt mixer. Further, these raw material components may be supplied to a melt mixer after being preliminarily mixed using a mortar, a Henschel mixer, a ball mill, a ribbon blender, and the like According to the liquid-crystalline resin composition of the present embodiment, it is possible to mold a molded article having a small surface roughness (Sa) while suppressing the anisotropy of the mold shrinkage rate.

<Molded Article>

The molded article of the present embodiment is a member obtained by molding the liquid-crystalline resin composition. As the method of molding the liquid-crystalline resin composition, a melt molding method is preferable. Examples of the melt molding method include an injection molding method; an extrusion molding method such as a T-die method or an inflation method; a compression molding method; a blow molding method; a vacuum molding method; and a press molding method. Among these, as the method of molding the liquid-crystalline resin composition, an injection molding method is preferable.

The conditions for molding the liquid-crystalline resin composition are not particularly limited and may be appropriately selected depending on the molding method. For example, in a case where molding is carried out using an injection molding method, the molding is carried out by setting the cylinder temperature of an injection molding machine (for example, a "hydraulic horizontal molding machine PS40E5ASE type", manufactured by Nissei Plastic Industrial Co., Ltd.) to be preferably in a range of 250° C. to 350° C. and setting the die temperature thereof to be preferably in a range of 20° C. to 180° C. In addition, from the viewpoint of the moldability, it is preferable that the cylinder temperature be lower than the 5% weight loss temperature of the fibrous filler formed of crystalline polysaccharides in the present embodiment. Specifically, it is preferable that the cylinder temperature be lower than the 5% weight loss temperature of the fibrous filler formed of crystalline polysaccharides by a range of 10° C. to 100° C.

Since the molded article of the present embodiment is formed by molding the liquid-crystalline resin composition described above, the surface roughness (Sa) can be sufficiently decreased while the anisotropy of the mold shrinkage rate is suppressed.

According to an aspect, the liquid-crystalline resin composition of the present invention is a composition which contains a liquid-crystalline resin, a fibrous filler formed of crystalline polysaccharides, and fillers other than the fibrous filler as desired, in which the crystalline polysaccharides are preferably one or more selected from the group consisting of cellulose, chitin, and derivatives of these and more preferably methyl cellulose, the 5% weight loss temperature of the fibrous filler is 280° C. or higher, preferably in a range of 280° C. to 350° C., and more preferably in a range of 280° C. to 330° C. and may be in a range of 280° C. to 320° C., in a range of 280° C. to 310° C., in a range of 280° C. to 300° C., or in a range of 280° C. to 290° C., the number-average fiber length of the fibrous filler is preferably in a range of 10 μm to 300 μm, more preferably in a range of 30 μm to 250 μm, and still more preferably in a range of 50 μm to 200 μm, the content of the fibrous filler is preferably in a range of 5 parts by mass to 50 parts by mass, more preferably in a range of 5 parts by mass to 25 parts by mass, still more preferably in a range of 7 parts by mass to 25 parts by mass, and particularly preferably in a range of 7 parts by mass to 21.5 parts by mass with respect to 100 parts by mass of the liquid-crystalline resin, the filler other than the fibrous filler is at least one selected from the group consisting of a fibrous filler other than the fibrous filler, a plate-like filler, and a granular filler, preferably a fibrous filler other than the fibrous filler, and more preferably glass fibers, and the content of the fillers other than the fibrous filler is preferably in a range of 5 parts by mass to 70 parts by mass, more preferably in a range of 10 parts by mass to 50 parts by mass, and still more preferably in a range of 21.5 parts by mass to 41 parts by mass with respect to 100 parts by mass of the liquid-crystalline resin.

As another aspect, the molded article of the present invention is an injection-molded article formed of the above-described liquid-crystalline resin composition according to an injection molding method.

EXAMPLES

Hereinafter, the present invention will be described based on the examples, but the present invention is not limited to these examples. Further, hereinafter, an example in which a liquid crystal polyester composition is prepared by employing liquid crystal polyester as a liquid-crystalline resin will be shown, but the present invention is not limited thereto.

[Measurement of Flow Starting Temperature of Liquid Crystal Polyester]

A cylinder on which a die having a nozzle with an inner diameter of 1 mm and a length of 10 mm was mounted was charged with approximately 2 g of liquid crystal polyester using a flow tester ("CFT-500 type", manufactured by Shimadzu Corporation), the liquid crystal polyester was melted and extruded from the nozzle while the temperature was increased at a rate of 4° C./min under a load of 9.8 MPa (100 kg/cm$^2$), and the temperature showing a viscosity of 4800 Pa·s (48000 poise) was measured.

[Measurement of 5% Weight Loss Temperature of Filler]

Thermogravimetric analysis was performed in an air atmosphere under conditions of a starting temperature of 30° C., an end temperature of 600° C., and a temperature rising rate of 20° C./min using a thermogravimetry device (DTG-50, manufactured by Shimadzu Corporation), the weight % of a sample at 150° C. was set to 100%, and the temperature at which the weight % of the sample reached 95% due to an increase in temperature was set as the 5% weight loss temperature.

In a case where the 5% weight loss temperature is increased, this means that the measured heat resistance of the filler becomes higher.

Production Example (Production of Liquid Crystal Polyester)

First, 994.5 g (7.2 moles) of p-hydroxybenzoic acid, 239.2 g (1.44 moles) of terephthalic acid, 159.5 g (0.96 moles) of isophthalic acid, 446.9 g (2.4 moles) of 4,4'-dihydroxybiphenyl, and 1347.6 g (13.2 moles) of acetic anhydride were added to a reactor provided with a stirrer, a torque meter, a nitrogen gas introduction pipe, a thermometer, and a reflux condenser.

Next, the gas in the reactor was substituted with nitrogen gas, 0.18 g of 1-methylimidazole was added to the reactor, and the mixture was heated from room temperature to 150° C. for 30 minutes while stirring under nitrogen gas flow and then refluxed at 150° C. for 30 minutes. Further, 2.4 g of 1-methylimidazole was added to the mixture, and the mixture was heated from 150° C. to 320° C. for 2 hours and 50 minutes while acetic acid generated as a by-product and unreacted acetic anhydride were distilled off. Thereafter, the contents were taken out from the reactor and cooled to room temperature at the time at which an increase in torque was observed.

The obtained solid matter (contents) was crushed by a crusher. The crushed solid matter was subjected to solid phase polymerization by heating the crushed solid matter from room temperature to 220° C. for 1 hour in a nitrogen atmosphere, further heated from 220° C. to 240° C. for 30 minutes, and held at 240° C. for 10 hours. The product after polymerization was cooled, thereby obtaining powdery liquid crystal polyester. The flow starting temperature of this liquid crystal polyester was 286° C.

Examples 1 to 6, Comparative Example 1, and Reference Example 1 (Preparation of Liquid Crystal Polyester Composition and Molding of Molded Article)

Hereinafter, preparation of a liquid crystal polyester composition will be described. Further, the following fibrous filler was used as a filler.

(Fibrous Filler)

Fibrous filler formed of crystalline polysaccharides: cellulose fibers "BioMid Fiber Uncoated", manufactured by Engineered Fibers Technology, LLC, 5% weight loss temperature of 332.86° C., number-average fiber length of 150 μm Glass fibers: glass fibers "EFH75-01", manufactured by Central Glass Co., Ltd., number-average fiber length of 75 μm Further, as the result of thermogravimetric analysis performed on the used glass fibers under the above-described conditions, weight loss was not observed.

(Molding)

The liquid-crystalline resin and the fibrous filler in the amounts listed in Table 1 were mixed with each other using a twin screw extruder ("PCM-30", manufactured by Ikegai Corp., cylinder temperature of 280° C.), thereby obtaining a pellet-like liquid crystal polyester composition. The obtained pellet-like liquid crystal polyester composition was molded at 300° C. using an injection molding machine ("PS40E5ASE", manufactured by Nissei Plastic Industrial Co., Ltd.). Further, two kinds of test pieces (molded articles) were obtained using two kinds of dies A and B during this injection molding. Hereinafter, the shapes of the dies A and B are described.

The die A is a die for a rod-like test piece which is provided with a gate on a surface of one end portion in a longitudinal direction and has a cavity having a width of 6.4 mm, a length of 127 mm, and a thickness of 12.7 mm.

The die B is a die for a flat test piece which is provided with a film gate on one side and has a cavity having a length of 64 mm, a width of 64 mm, and a thickness of 3 mm.

[Evaluation 1 (Surface Roughness (Sa))]

With the test piece prepared using the die A, the surface on a movable side of the die was set as a measurement surface and the surface roughness (Sa) was measured five times under a condition of a measurement area of 27 mm² using a 3D microscope "VR-3200" (manufactured by KEYENCE CORPORATION). The average value of the five measurements was set as the surface roughness (Sa) of the test piece. Here, in a case where the numerical value of the surface roughness (Sa) is decreased, this indicates that the surface of a molded article to be obtained is smooth.

[Evaluation 2 (Anisotropy Ratio Between Mold Shrinkage Rates)]

The length of each side of the test piece prepared using the die B was measured using a micrometer. The mold shrinkage rate of each side was acquired by dividing a difference between a measured value of the test piece and a dimension of the cavity of the die at room temperature (20° C.) by the dimension of the cavity. Next, the anisotropy ratio (MD/TD) between the mold shrinkage rates was acquired by dividing the mold shrinkage rate in the flow direction (hereinafter, referred to as "MD") of the test piece by the mold shrinkage rate in the direction perpendicular to the flow direction (hereinafter, referred to as "TD") thereof. Further, the average value of the mold shrinkage rates for two sides of the test piece along the flow direction of the resin (liquid crystal polyester) was set as MD and the average value of the mold shrinkage rates for two sides of the test piece along the direction perpendicular to the flow direction of the resin was set as TD. In the evaluation 2, in a case where the anisotropy ratio between the mold shrinkage rates is closer to 1, this indicates that the anisotropy of the mold shrinkage rate in the molded article decreases. In other words, in the present invention, it can be said that the anisotropy of the mold shrinkage rate in a molded article to be obtained is suppressed as the anisotropy ratio is closer to 1.

The results of the evaluation 1 and the evaluation 2 performed on the molded articles of Examples 1 to 6, Comparative Example 1, and Reference Example 1 are listed in Table 1.

TABLE 1

| | Liquid-crystalline resin Parts by mass | Fibrous filler | | Evaluation 1 Surface roughness (Sa) μm | Evaluation 2 Anisotropy ratio between mold shrinkage rates (MD/TD) — |
|---|---|---|---|---|---|
| | | Glass fibers Parts by mass | Cellulose fibers Parts by mass | | |
| Example 1 | 100 | 41 | 2 | 1.8 | 4.8 |
| Example 2 | 100 | 38 | 5 | 1.9 | 3.7 |
| Example 3 | 100 | 36 | 7 | 2.5 | 2.9 |
| Example 4 | 100 | 29 | 14 | 1.6 | 2.0 |
| Example 5 | 100 | 21.5 | 21.5 | 2.2 | 1.9 |
| Example 6 | 100 | 0 | 15 | 2.9 | 2.0 |
| Comparative Example 1 | 100 | 43 | 0 | 3.7 | 4.5 |
| Reference Example 1 | 100 | 0 | 0 | — | 9.2 |

Based on the results of the evaluation 1, in Comparative Example 1 in which only glass fibers were used as a filler, the surface roughness (Sa) was 3.7. Meanwhile, in Examples 1 to 5 in which glass fibers and cellulose fibers were used in combination as a filler, the surface roughness (Sa) was in a range of 1.6 to 2.5. In other words, in Examples 1 to 5, the surface roughness (Sa) of each molded article was smaller than that of Comparative Example 1, and the surface of each molded article was smoother.

Further, in Example 6 in which only cellulose fibers were used as a filler, the surface roughness (Sa) of the molded article was smaller than that of Comparative Example 1. In addition, it was shown that the anisotropy of the mold shrinkage rates was suppressed regardless of the fact that the content of the filler was small.

Based on the results of the evaluation 2, in Reference Example 1 in which a filler was not used, the anisotropy ratio between the mold shrinkage rates was 9.2. Meanwhile, in Examples 1 to 6 and Comparative Example 1 in which glass fibers or cellulose fibers or both of these were used as a filler, the anisotropy ratio between the mold shrinkage rates was in a range of 1.9 to 4.8. In other words, in Examples 1 to 6 and Comparative Example 1, the anisotropy ratio between the mold shrinkage rates was smaller than that of Reference Example 1, and it was shown that the anisotropy of the mold shrinkage rates was suppressed. Particularly, in Examples 2 to 6 in which the content of cellulose fibers was in a range of 5 parts by mass to 50 parts by mass, the anisotropy ratio between the mold shrinkage rates was particularly small, and it was shown that the anisotropy of the mold shrinkage rates was further suppressed.

Based on the results described above, it was confirmed that the present invention is useful.

INDUSTRIAL APPLICABILITY

According to the present invention, since it is possible to provide a liquid-crystalline resin composition that enables molding of a molded article having a small surface roughness while suppressing the anisotropy of the mold shrinkage rate and the molded article thereof, the present invention is extremely useful industrially.

The invention claimed is:

1. A liquid-crystalline resin composition, containing:
a liquid-crystalline resin comprising a liquid crystal polyester;
a fibrous filler formed of crystalline polysaccharides; and
a glass fiber;
wherein a 5% weight loss temperature of the fibrous filler is 280° C. or higher,
the fibrous filler is cellulose or derivatives thereof,
a content of the fibrous filler is in a range of 5 parts by mass to 21.5 parts by mass with respect to 100 parts by mass of the liquid-crystalline resin,
a content of the glass fiber is in a range of 21.5 parts by mass to 50 parts by mass with respect to 100 parts by mass of the liquid-crystalline resin and
a content of the glass fiber is in a range of 100 parts by mass to 800 parts by mass with respect to 100 parts by mass of the fibrous filler.

2. A molded article which is formed by molding the liquid-crystalline resin composition according to claim 1.

3. The liquid-crystalline resin composition according to claim 1, wherein a content of the fibrous filler is in a range of 5 parts by mass to 21.5 parts by mass with respect to 100 parts by mass of the liquid-crystalline resin, and
a content of the fibrous filler is in a range of 3.5% by mass to 15% by mass, and a content of the glass fiber is in a range of 15% by mass to 26.6% by mass, with respect to the total mass of the liquid-crystalline resin composition.

4. A molded article which is formed by molding the liquid-crystalline resin composition according to claim 3.

5. The liquid-crystalline resin composition according to claim 1,
wherein the liquid crystal polyester comprises a repeating unit derived from an aromatic hydroxycarboxylic acid.

6. The liquid-crystalline resin composition according to claim 1,
wherein the liquid crystal polyester comprises at least one repeating unit selected from the group consisting of repeating units represented by formulae $(A_1)$ to $(A_5)$:

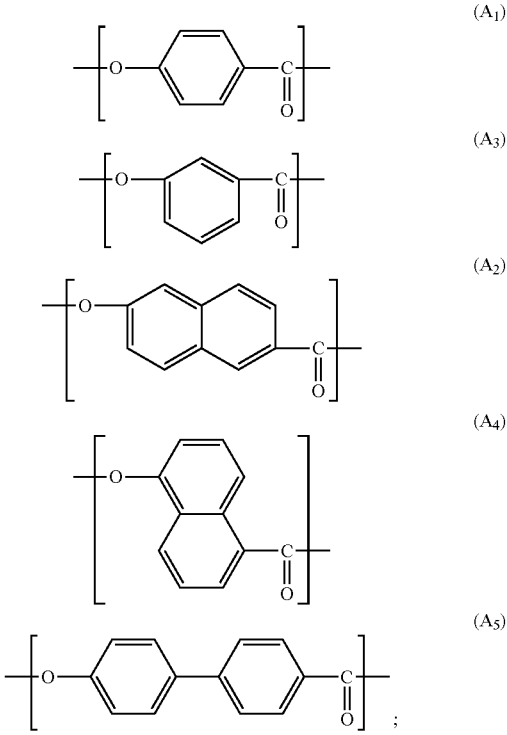

at least one repeating unit selected from the group consisting of repeating units represented by formulae $(B_1)$ to $(B_7)$:

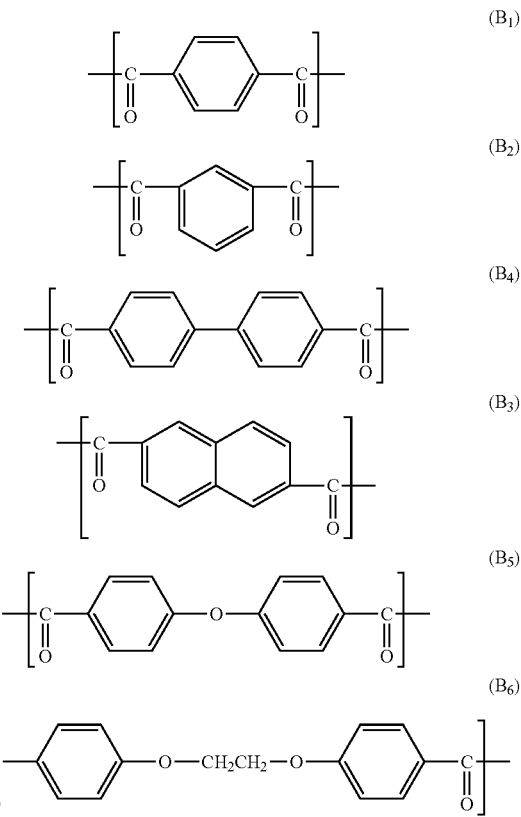

-continued

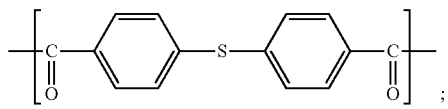
(B₇)

and
at least one repeating unit selected from the group consisting of repeating units represented by formulae $(C_1)$ to $(C_6)$:

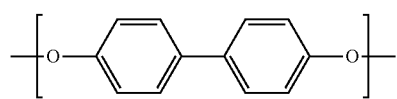
(C₁)

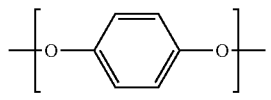
(C₂)

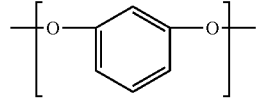
(C₃)

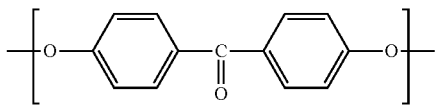
(C₄)

-continued

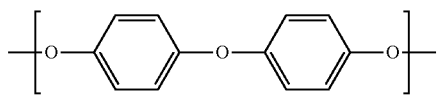
(C₅)

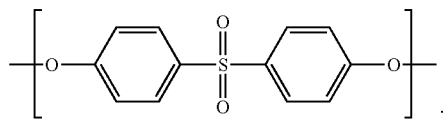
(C₆)

7. The liquid-crystalline resin composition according to claim 6,
wherein the liquid crystal polyester has the repeating unit represented by formula $(A_1)$, the at least one repeating unit selected from the group consisting of repeating units represented by the formulae $(B_1)$ and $(B_2)$, and the repeating unit represented by formula $(C_1)$.

8. The liquid-crystalline resin composition according to claim 1,
wherein the 5% weight loss temperature of the fibrous filler is 300° C. or higher.

9. The liquid-crystalline resin composition according to claim 1,
wherein the 5% weight loss temperature of the fibrous filler is 330° C. or higher.

* * * * *